Patented Jan. 9, 1951

2,537,124

UNITED STATES PATENT OFFICE 2,537,124

LATEX ADHESIVE CONTAINING PHENOLPHTHALEIN AND METHOD OF USING THE SAME

Roland D. Earle, Cohasset, and Charles I. Sullivan, Saugus, Mass., assignors to Union Bay State Co., Inc., Cambridge, Mass., a corporation of Massachusetts No Drawing. Application January 23, 1946, Serial No. 642,997

7 Claims. (Cl. 154—140)

This invention relates to a method of bonding surfaces and an adhesive composition for use therein.

In various types of cementing operations employing aqueous dispersions of an adhesive compound such, for example, as natural and synthetic latices, resin dispersions, etc., considerable difficulty is encountered in estimating or determining both the amount of dispersion applied to the surfaces to be bonded and the time when the coated surfaces should be brought together to effect an adhesive bond. Such difficulties are particularly troublesome on surfaces having irregularities, reentrant portions, etc., such as in shoe making operations wherein aqueous dispersions of the above type are commonly used. For example, in platform attaching and lasting operations latex or the like aqueous dispersion is brushed, sprayed or otherwise applied to the wrapper or lasting allowance and the face of a platform or sole, and due to the surface irregularities, particularly the pocket defined by the junction of the platform or wrapper, an objectionably heavy deposit or accumulation of the dispersion often results, which, if not properly dried out, impairs or destroys the adhesive bond between the parts. In such cases the surface of the liquid film dries out, forming a relatively impervious skin which prevents or resists proper drying of the dispersion beneath the skin, and hence the parts can not be properly bonded within the time usually permitted to complete the operation.

Moreover, where latex or the like dispersion is properly applied so as to avoid such heavy deposits, there is still encountered a further difficulty in determining the time which should be permitted to lapse between the application of the dispersion and bringing the parts together. With certain types of synthetic latices that produce relatively non-tacky films when dry, great care must be exercised to see to it that the films are brought together during the relatively short period when they are initially dry and tacky. For a given formulation this time element is dependent on the thickness of the film and atmospheric conditions, the latter being apt to vary widely from day to day. Consequently, it is usually necessary to resort to trial-and-error procedures with consequent impairment of production.

The principal objects of the present invention are to provide a method of bonding surfaces which minimizes, if not overcomes, the aforementioned difficulties, and to provide an adhesive composition for use in such method. Further objects will be apparent from a consideration of the following disclosure.

In accordance with the present invention, there is applied to the surfaces to be bonded a dispersion or emulsion having a dispersed phase comprising a film-forming adhesive composition of light color (i. e., relatively free from dark colored pigments or other coloration which would obscure a red color) and a continuous phase comprising an alkaline material in an amount sufficient to produce a pH of at least 9 and at least 0.03% of phenolphthalein, based on the dry weight of the dispersed phase, the phenolphthalein being effective to impart a red coloration to the dispersion. The dispersion may be applied by spraying, brushing, machine application, or otherwise, and the liquid film thus produced has a red or pink coloration which, for a given formulation, varies in accordance with the thickness of the liquid film and hence provides a reliable indication of the amount of dispersion applied to a given area. Consequently, the operator may gauge the application of the dispersion so as to produce the optimum deposition for the particular type of bond required.

As the film dries out, the red color slowly fades and by the time initial drying has taken place, the red or pink color has entirely disappeared, due either to the loss of alkali in the case of ammonia and the like volatile alkalies, the possible oxidation of the phenolphthalein compound with an accompanying reduction in pH, or the formation of the tribasic salts of phenolphthalein in the case of non-volatile alkalies, such as sodium hydroxide, potassium hydroxide, etc. With the exception of surfaces containing a relatively high amount of water soluble acidic material, the loss or disappearance of the red coloration usually occurs at the completion of initial drying of the film, and hence affords a reliable indication of the minimum time that must elapse before bringing together the coated surfaces, and in any case the presence of a red or pink coloration is a definite indication that the film has not dried out sufficiently to produce a satisfactory bond, thus affording a reliable warning that further drying is necessary before bringing the parts together.

The term "film-forming adhesive composition," as herein used, denotes the various types of film-forming polymers and condensation products which constitute the dispersed phase of the dispersion or emulsion, the aqueous phase of which has a pH of at least 9 and preferably not more than 12. The following materials are illustrative of the various types of commercially available products that may be used in latex or dispersed form in practicing the present invention:

Natural rubber latex (normal and concentrated)
Polychloroprene latices
Butadiene-styrene latices
Butadiene-acrylonitrile latices
Polyethylene dispersion
Polysulfide dispersions
Polyisobutene dispersions
Natural resin (rosin, ester gum, etc.) dispersions
Alkyl and maleic resin dispersions
Polystyrene dispersions
Polyvinyl acetate dispersions
Polyvinyl acetal dispersions
Polyvinyl butyral dispersions
Polyvinyl chloride dispersions
Polyacrylate resin dispersions
Polyacrylic acid-ester resin dispersions
Hydrocarbon resin dispersions
Cellulose ester dispersions
Cellulose ether dispersions
Compatible mixtures of two or more of the foregoing products.

The amount of phenolphthalein that must be used may vary from a minimum of 0.03%, based on the dry solids content of the dispersion, to a maximum which need not exceed 5%, practical working limits being from 0.5% to 1%. There is, however, little or nothing to be gained by going beyond the practical minimum necessary to impart to the dispersion the desired depth of color. The phenolphthalein may be, and preferably is, incorporated in the dispersion in the form of a KOH (or NaOH) solution, but if desired the phenolphthalein may be dissolved in an aqueous-alcohol mixture and then added to a properly stabilized latex or dispersion; or the phenolphthalein may be dispersed in water, as by ball-milling, and then added to the adhesive dispersion with or without additional alkali, stabilizers, etc., depending upon the character of the dispersion to which it is added.

Although the vast majority of natural and synthetic latices and dispersions contain some form of alkali, either as a soap, stabilizer and/or emulsifier, it may be desirable to add a slight amount of alkali so as to insure a minimum pH of 9, and to this end a small amount of an aqueous solution of NaOH, KOH, NH4OH, or any of the organic amines may be incorporated along with the phenolphthalein. However, the preferred procedure is to prepare a phenolphthalein solution by dissolving one mol of phenolphthalein in water containing three to five mols of KOH (or the equivalent alkali), a recommended formulation being as follows:

100 grams phenolphthalein
56.5 grams KOH
1630 grams of water

The solution thus produced contains about 5.5% phenolphthalein, and from 200 ml. to 400 ml. of this solution may be added for each gallon of dispersion containing approximately 50% solids, a greater or lesser amount of the solution being used where the dispersion has a higher or lower pH.

As a general rule, the higher the pH, the lower the amount of phenolphthalein required, and at high pH values the red color disappears more slowly. For example, approximately 0.1% phenolphthalein may be used with dispersions having a pH of 12, whereas it is advisable to use 0.5% phenolphthalein with dispersions having a pH of about 9.7, and 2% phenolphthalein with a dispersion having a pH of about 9.4, at which pH the color of the dispersion is less intense than at the higher pH values. Accordingly, the dispersion should have a pH of at least 9, and when the use of the dispersion is such as to permit a higher pH, a range between 10 and 12 is recommended.

If desired, the usual compounding ingredients (other than carbon black and appreciable amounts of dark-colored materials) may be incorporated in the dispersion before or after adding the phenolphthalein, and the compounded material thus prepared may be applied in the manner above described.

We are aware that various indicators are used to determine qualitatively the presence of alkali in latex and also in the quantitative determination of alkali and other ingredients of dispersions, but in all such cases the amount of indicator actually used is so insignificant as to be entirely incapable of obtaining the objectives of the present invention, viz., to afford a reliable indication of the thickness and uniformity of the film deposited and time required for initial drying of the film before bringing the parts together to produce a satisfactory adhesive bond.

We claim:

1. The method of bonding surfaces, which comprises applying to said surfaces a dispersion having a dispersed phase comprising a hydrophobic film-forming adhesive composition relatively free from dark colored pigments, and an aqueous phase including an alkaline material in an amount sufficient to produce a pH of not less than 9 and not more than about 13 and containing at least 0.03% phenolphthalein based on the dry weight of the dispersed phase, the dispersion being characterized by a red coloration, drying said dispersion until the red coloration produced by said phenolphthalein disappears, and thereafter bringing the surfaces together to effect an adhesive bond.

2. The method of bonding surfaces, which comprises applying to said surfaces a dispersion having a dispersed phase comprising a hydrophobic film-forming adhesive composition relatively free from dark colored pigments, and an aqueous phase including an alkaline material in an amount sufficient to produce a pH of not less than 9 and not more than about 13 and containing from 0.5% to 1% phenolphthalein based on the dry weight of the dispersed phase, the dispersion being characterized by a red coloration, drying said dispersion until the red coloration produced by said phenolphthalein disappears, and thereafter bringing the surfaces together to effect an adhesive bond.

3. The method of bonding surfaces, which comprises applying to said surfaces a dispersion having a dispersed phase comprising a hydrophobic film-forming adhesive composition relatively free from dark colored pigments and an aqueous phase including an alkaline material in an amount sufficient to produce a pH of not less than 9 and not more than about 13 and containing at least 0.03% phenolphthalein based on the dry weight of the dispersed phase, the dispersion being characterized by a red coloration, and the application of the dispersion being such as to produce a liquid film having a uniform depth as indicated by the coloration of the liquid film, drying said dispersion until the red coloration produced by said phenolphthalein disappears, and hereafter bringing the surfaces together to effect an adhesive bond.

4. An adhesive comprising a dispersion having a dispersed phase comprising a hydrophobic film-forming adhesive composition relatively free from dark-colored pigments, and an aqueous continuous phase including an alkaline material in an amount sufficient to product a pH of not less than 9 and not more than about 13 and containing at least 0.03% phenolphthalein based on the dry weight of the dispersed phase.

5. An adhesive comprising a dispersion having a dispersed phase comprising a hydrophobic film-forming adhesive composition relatively free from dark-colored pigments, and an aqueous continuous phase comprising an alkaline compound in an amount sufficient to produce a pH of not less than 9 and not more than about 13 and at least 0.03% phenolphthalein based on the dry weight of the dispersed phase.

6. An adhesive comprising a dispersion having a dispersed phase comprising a rubber latex adhesive composition relatively free from dark-colored pigments, and a continuous phase comprising an aqueous solution of an alkaline compound in an amount sufficient to produce a pH of not less than 9 and not more than about 13 and from 0.5% to 1% of phenolphthalein based on the dry weight of the dispersed phase.

7. An adhesive comprising a dispersion having a dispersed phase comprising a rubber latex adhesive composition relatively free from dark-colored pigments and, an aqueous continuous phase comprising a solution of approximately 1 mol of phenolphthalein to 3 to 5 mols of an alkali metal hydroxide, the phenolphthalein being present in an amount of at least 0.03% of the dry weight of the dispersed phase.

ROLAND D. EARLE.
CHARLES I. SULLIVAN.

REFERENCES CITED

The following references are of record in the file of this patent:

UNITED STATES PATENTS

| Number | Name | Date |
|---|---|---|
| 650,149 | Howard | Mar. 22, 1900 |
| 1,844,199 | Bicknell et al. | Feb. 9, 1932 |
| 2,210,862 | Tronstad | Aug. 6, 1940 |
| 2,249,867 | Snelling | July 22, 1941 |
| 2,250,521 | Boeder | July 29, 1941 |
| 2,279,230 | Frost | Apr. 7, 1942 |
| 2,301,481 | Trowell | Nov. 10, 1942 |
| 2,315,049 | Cronstedt | Mar. 30, 1943 |

FOREIGN PATENTS

| Number | Country | Date |
|---|---|---|
| 223,968 | Germany | July 4, 1910 |

OTHER REFERENCES

Meyers et al., "Ber. Deut. Chem. Ges.," vol. 41 (1908), pages 2446 and 2452. (Copy in Scientific Library.)